(12) United States Patent
Isono (10) Patent No.: US 7,646,553 B2
(45) Date of Patent: Jan. 12, 2010

(54) IMAGING OPTICAL SYSTEM

(75) Inventor: Masashi Isono, Hoi-gun (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 247 days.

(21) Appl. No.: 11/593,818

(22) Filed: Nov. 7, 2006

(65) Prior Publication Data
US 2007/0109668 A1 May 17, 2007

(30) Foreign Application Priority Data
Nov. 15, 2005 (JP) ............... 2005-329957

(51) Int. Cl.
*G02B 9/12* (2006.01)
*G02B 13/18* (2006.01)
(52) U.S. Cl. ...................... 359/791; 359/716
(58) Field of Classification Search ................ 359/791, 359/773, 779–780, 767–769, 759–760, 713–716
See application file for complete search history.

(56) References Cited
U.S. PATENT DOCUMENTS
7,184,225 B1 * 2/2007 Noda .......................... 359/784
7,385,770 B2 * 6/2008 Nakamura ................... 359/784

FOREIGN PATENT DOCUMENTS
| EP | 1 496 382 A2 | 1/2005 |
| JP | 2003-322792 A | 11/2003 |
| JP | 2004-163849 A | 6/2004 |

OTHER PUBLICATIONS
European Search Report dated Jan. 26, 2007, for counterpart European Application No. EP 06 02 3451 with Communication/Minutes.

* cited by examiner

*Primary Examiner*—Jordan M. Schwartz
(74) *Attorney, Agent, or Firm*—Sidley Austin LLP

(57) ABSTRACT

An imaging optical system, which is designed in a small size with low manufacturing costs, aberrations such as chromatic aberration of the imaging optical system being appropriately corrected, is provided. The imaging optical system comprises a first lens having positive power, a second lens having positive power and a third lens having negative power with an aspherical surface in the image side, the aspherical surface being shaped in a concave shape facing toward an image side in a vicinity of the optical axis and shaped in a convex shape facing toward the image side in a surrounding of the optical axis. The imaging optical system is designed to satisfy a formula, $v3-v2>10$, where $v3$ denotes an Abbe number of the third lens and $v2$ denotes an Abbe number of the second lens.

6 Claims, 4 Drawing Sheets

FIG. 5(A) FNO = 4.00 — SPHERICAL ABERRATION / SINE CONDITIONS (d, g, c, SC)

FIG. 5(B) Y' = 2.8 — ASTIGMATISM (DM, DS)

FIG. 5(C) Y' = 2.8 — DISTORTION %

FIG. 6(A) FNO = 4.00 — SPHERICAL ABERRATION / SINE CONDITIONS (d, g, c, SC)

FIG. 6(B) Y' = 2.8 — ASTIGMATISM (DM, DS)

FIG. 6(C) Y' = 2.8 — DISTORTION %

IMAGING OPTICAL SYSTEM

This application is based on Japanese Patent Applicationd No. 2005-329957 filed on Nov. 15, 2005, in Japanese Patent Office, the entire content of which is hereby incorporated by reference.

TECHNICAL FIELD

The present invention relates to an imaging optical system which is capable of guiding lights to an image pickup device, particulary to an imaging optical system which is suitable for digital cameras and cellular phones.

BACKGROUND

In recent years, digital camera, which is capable of simply transmitting images into a personal computer, has become popular accordance with popularization of personal computers. It has also popularized that a digital camera is employed into an information processing apparatus, such as a mobile computer, a cellular phone, and a PDA (Personal Digital Assistance). In accordance with the popularization of digital cameras, a smaller sized digital camera has been required. Thus it is necessary to further minimize the size of the imaging optical system.

The tendency to higher resolution of an image pickup device and to a bigger sized screen for the images has progressed. Japanese Laid-Open Patent Publication Nos. 2003-322792 and 2004-163849 disclosed small sized imaging optical systems which are capable of corresponding to the image pickup device.

The imaging optical systems disclosed in Japanese Laid-Open Patent Publication Nos. 2003-322792 and 2004-163849 are designed to minimize the size of the imaging optical systems by using three lenses. However, it is hard to say that the imaging optical systems have enough optical performances in aberration correction, such as chromatic aberration.

SUMMARY

An object of the present invention is to provide a small sized imaging optical system with low manufacturing costs, the aberration of which, such as chromatic aberration having been appropriately corrected. In view of forgoing, one embodiment according to one aspect of the present invention is an imaging optical system for focusing light from an object on an image pickup device, comprising:

a first lens with positive power on an object side;

a second lens with positive power on an image side of the first lens; and a third lens with negative power on an image side of the second lens, an image side surface of the third lens being aspherical, wherein the aspherical surface is concave to the image side in a vicinity of an optical axis and convex to the image side in a surrounding of the optical axis, and an Abbe number v2 of the second lens and an Abbe number v3 of the third lens satisfy the following relationship:

$$v3-v2>10$$

DETAILED DESCRIPTION OF THE PREFERRED EMBODIMENT

While the preferred embodiments of the present invention have been described using specific terms, such description is for illustrative purpose only, and it is to be understood that changes and variations may be made without departing from the spirit or scope of the appended claims. A structure of an imaging optical system will be described by using FIGS. 1-4. The imaging optical system illustrated in FIG. 1, which illustrates the first embodiment of the invention, comprises a first lens L1 having positive power, a diaphragm S, a second lens L2 having positive power and a third lens L3 having negative power in the order of a position from an object side.

Figure 1:
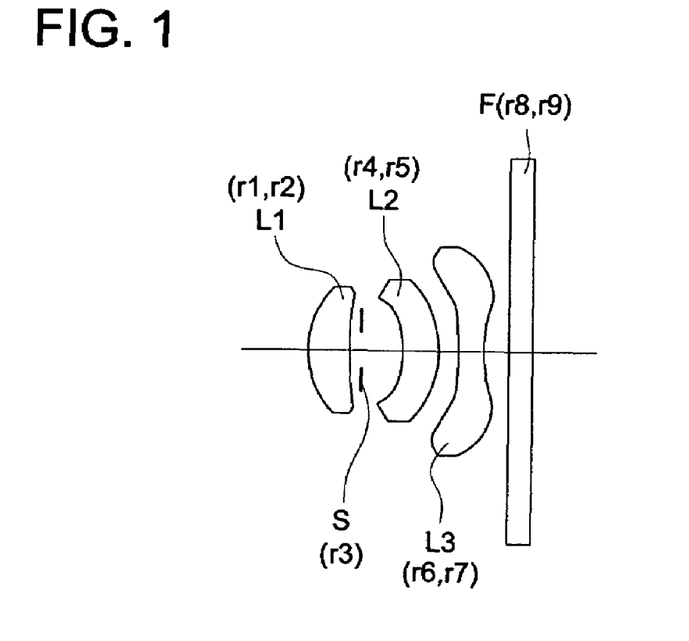
FIG. 1 illustrates a structure of an imaging optical system of the first embodiment.

The first lens L1 has a meniscus shape, a convex surface of the first lens L1 facing toward an object side, both faces of the first lens L1 having aspherical surfaces. The second lens L2 has a meniscus shape, a convex surface of the second lens L2 facing toward an image side, both faces of the first lens L2 having aspherical surfaces. The third lens L3 has a meniscus shape, a concave surface of the third lens L3 facing toward the image side, both faces of the first lens L3 having aspherical surfaces. The aspherical surface in the image side of the third lens L3 is shaped in a concave structure facing toward the image side in a vicinity of the optical axis and is shaped in a convex structure facing toward the image side in a surrounding of the optical axis.

The second lens L2 is a plastic lens having a high dispersion characteristic and the third lent L3 is a plastic lens having a low dispersion characteristic.

Figure 2:
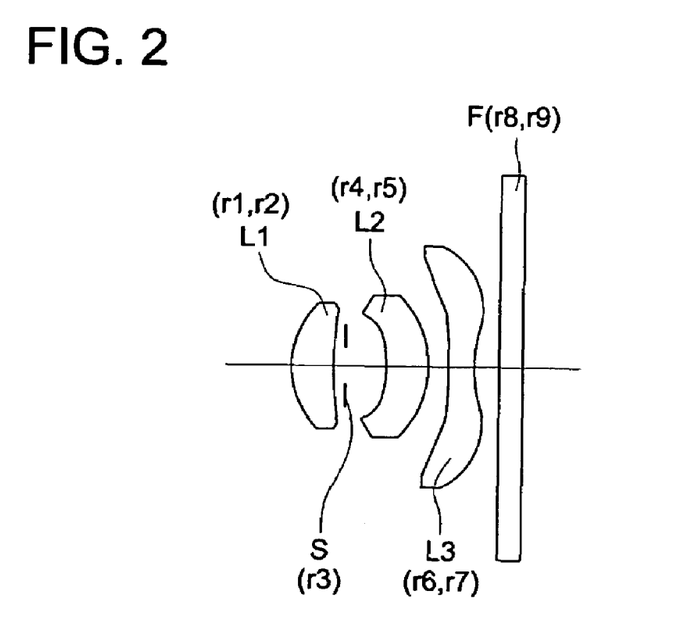
FIG. 2 illustrates a structure of an imaging optical system of the second embodiment.

The imaging optical system illustrated in FIG. 2, which illustrates the second embodiment of the invention, comprises a first lens L1 having positive power, a diaphragm S, a second lens L2 having positive power and a third lens L3 having negative power in the order of a position from an object side.

The first lens L1 has a meniscus shape, a convex surface of the first lens L1 facing toward an object side, both faces of the first lens L1 having aspherical surfaces. The second lens L2 has a meniscus shape, a convex surface of the second lens L2 facing toward an image side, both faces of the first lens L2 having aspherical surfaces. The third lens L3 has a meniscus shape, a concave surface of the third lens L3 facing toward the image side, both faces of the first lens L3 having aspherical surfaces. The aspherical surface in the image side of the third lens L3 is shaped in a concave structure facing toward the image side in a vicinity of the optical axis and is shaped in a convex structure facing toward the image side in a surrounding of the optical axis.

The second lens L2 is a plastic lens having a high dispersion characteristic and the third lent L3 is a plastic lens having a low dispersion characteristic.

Figure 3:
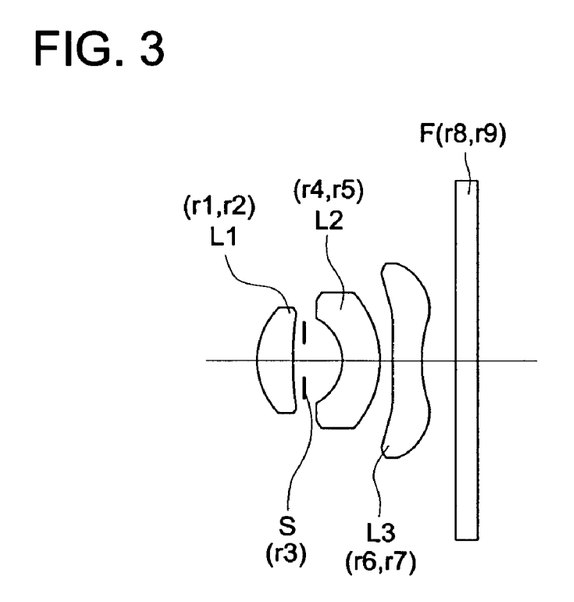
FIG. 3 illustrates a structure of an imaging optical system of the third embodiment.

The imaging optical system illustrated in FIG. 3, which illustrates the third embodiment of the invention comprises a first lens L1 having positive power, a diaphragm S, a second lens L2 having positive power and a third lens L3 having negative power in the order of a position from an object side.

The first lens L1 has a meniscus shape, a convex surface of the first lens L1 facing toward an object side, both faces of the first lens L1 having aspherical surfaces. The second lens L2 has a meniscus shape, a convex surface of the second lens L2 facing toward an image side, both faces of the first lens L2 having aspherical surfaces. The third lens L3 has a meniscus shape, a concave surface of the third lens L3 facing toward the image side, both faces of the first lens L3 having aspherical surfaces. The aspherical surface in the image side of the third lens L3 is shaped in a concave structure facing toward the image side in a vicinity of the optical axis and is shaped in a convex structure facing toward the image side in a surrounding of the optical axis.

The second lens L2 is a plastic lens having a high dispersion characteristic and the third lent L3 is a plastic lens having a low dispersion characteristic.

Figure 4:
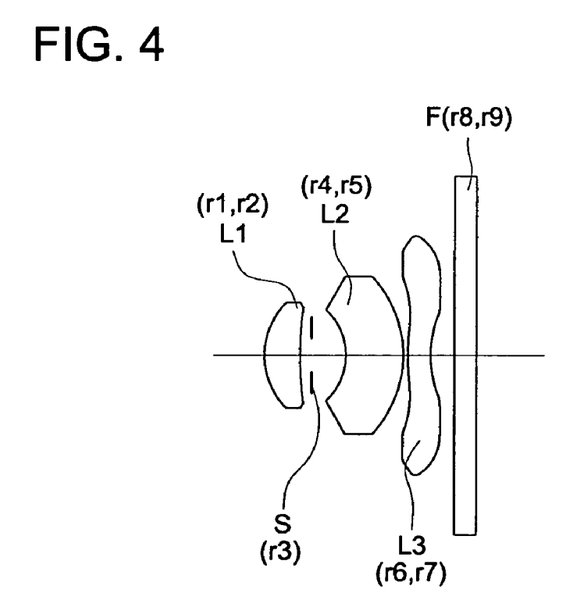
FIG. 4 illustrates a structure of an imaging optical system of the fourth embodiment.
Figure 5A:
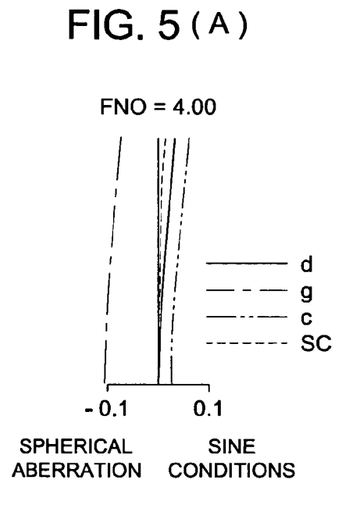
FIGS. 5(A) to 5(C) illustrate aberrations of an imaging optical system of the first embodiment.
Figure 5B:
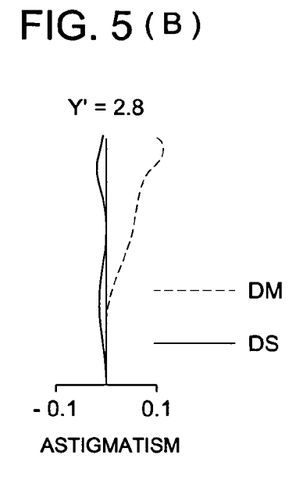
Figure 5C:
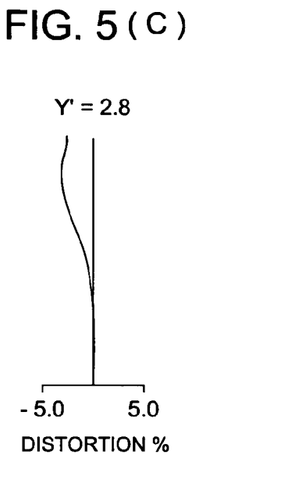
Figure 6A:
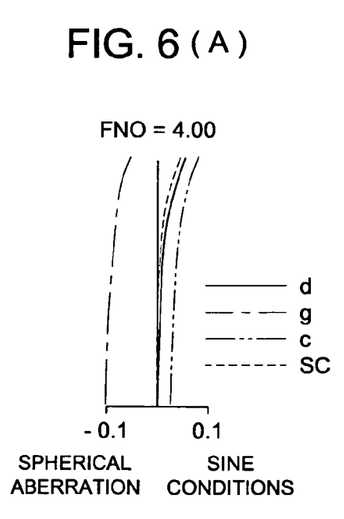
FIGS. 6(A) to 6(C) illustrate aberrations of an imaging optical system of the second embodiment.
Figure 6B:
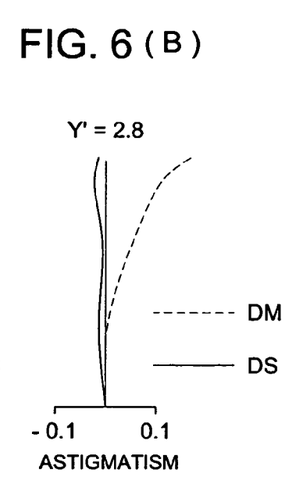
Figure 6C:
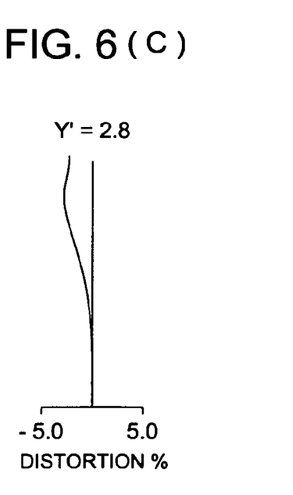
Figure 7A:
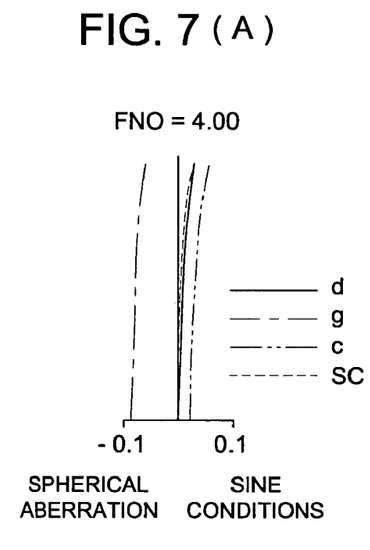
FIGS. 7(A) to 7(C) illustrate aberrations of an imaging optical system of the third embodiment.
Figure 7B:
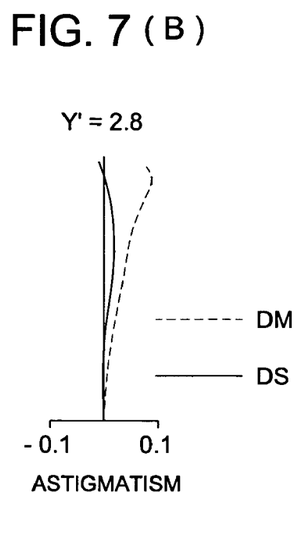
Figure 7C:
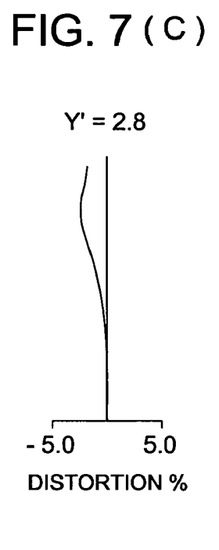
Figure 8A:
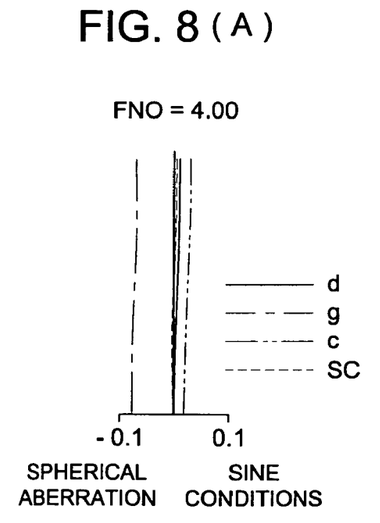
FIGS. 8(A) to 8(C) illustrate aberrations of an imaging optical system of the fourth embodiment.
Figure 8B:
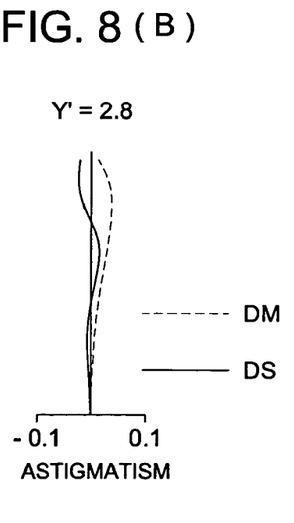
Figure 8C:
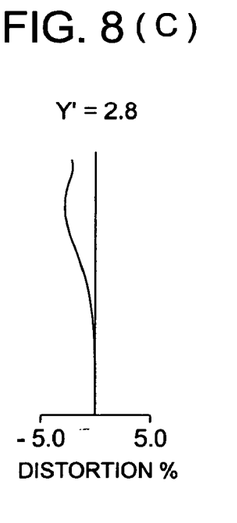

The imaging optical system illustrated in FIG. 4, which illustrates the fourth embodiment of the invention comprises a first lens L1 having positive power, a diaphragm S, a second lens L2 having positive power and a third lens L3 having negative power in the order of a position from an object side.

The first lens L1 has a meniscus shape, a convex surface of the first lens L1 facing toward an object side, both faces of the first lens L1 having aspherical surfaces. The second lens L2 has a meniscus shape, a convex surface of the second lens L2 facing toward an image side, both faces of the first lens L2 having aspherical surfaces. The third lens L3 has a meniscus shape, a concave surface of the third lens L3 facing toward the image side, both faces of the first lens L3 having aspherical surfaces. The aspherical surface in the image side of the third lens L3 is shaped in a concave structure facing toward the image side in a vicinity of the optical axis and is shaped in a convex structure facing toward the image side in a surrounding of the optical axis.

The second lens L2 is a plastic lens having a high dispersion characteristic and the third lent L3 is a plastic lens having a low dispersion characteristic.

In the first to fourth embodiments, an infrared cut filter F including a cover glass is provided in the image side of the imaging optical system. In this specification, "power" denotes a value defined by a reciprocal number of a focal length.

The imaging optical system for forming an image on an image pickup device by using light from an object in each embodiment described above is structured by three lenses arranged in the order of a position from the object side, the three lenses which are the first lens L1 having positive power, the second lens L2 having positive power and the third lens L3 having negative power, which has an aspherical surface being shaped in a concave structure facing toward the image side in the vicinity of the optical axis of the third lens L3 and is shaped in a convex structure facing toward the image side in the surrounding of the optical axis.

According to this structure, the total length of the imaging optical system can be shortened. Since an exit pupil moves to the point far away from the image surface and the incident angle to an edge portion of the image surface becomes small, the quantity of incident lights to the image surface is able to be uniform.

Further, the structure satisfies a following formula (1).

$$v3-v2>10 \tag{1}$$

Where v3 denotes an Abbe number of the third lens and v2 denotes an Abbe number of the second lens.

The formula (1) provides the Abbe number of the third lens within an appropriate range against the Abbe number of the second lens. Peripheral light, which reaches to the edge portion of the image surface, passes through the vicinity of the optical axis of the second lens and passes through the edge portion (surrounding) around the optical axis of the third lens. However, since the third lens is shaped in a convex shape with an aspherical surface in the edge portion of the third lens in the image side, and the edge portion of the third lens has positive power, the peripheral light passing through the edge portion of the third lens are converged more compared with the lights passing through the second lens. Consequently, chromatic aberration of magnification of the total optical system is able to be corrected by selecting the Abbe number of the third lens, which is larger than that of the second lens, namely by structuring the imaging optical system by applying a second lens having a high dispersion characteristic and a third lens having a low dispersion characteristic. When the value of v3−v2 is set outside of the range defined by the formula (1), the correction of the chromatic aberration of magnification becomes under, chromatic bleeding in the edge portion of the image surface becomes large and image quality in the edge portion of the image surface becomes low.

It is preferable to satisfy following formula (1') instead of the formula (1).

$$v3-v2>15 \tag{1'}$$

It is further preferable to satisfy following formula (1") instead of the formula (1).

$$v3-v2>20 \tag{1"}$$

The embodiment has a structure in which a diaphragm is provided between the first lens and the second lens. According to this structure, since the first lens and the second lens are to be symmetrically positioned with respect to the diaphragm, several aberrations are able to be balanced and lens performances also are able to be improved.

The first to third lenses may be structured by a diffraction type lens for diffracting incident lights based on a diffraction action, a refraction-diffraction hybrid lens for diffracting incident lights based on a combination action of the diffraction action and a refraction action, or a refractive index distribution type lens in which a refractive index changes according to the distance from the optical axis to the edge of a material of the lens. The first to third lenses may also be structured by a homogeneous material. Since easier manufacturing is possible with this type of lens comparing with the refractive index distribution type lens, less expensive imaging optical lenses can be provided.

Further, the imaging optical system satisfies a following formula (2).

$$|f3/f2|<0.9 \tag{2}$$

Where, f3 denotes a focal length of the third lens and f2 denotes a focal length of the second lens.

The formula (2) provides the power of the third lens against the power of the second lens within an appropriate range to correct the chromatic aberration of magnification and the distortion aberration. When the value of |f3/f2| is set outside of the range defined by the formula (2), the correction of the chromatic aberration of magnification becomes under, chromatic bleeding in the edge portion of the image surface becomes large and image quality in the edge portion of the image surface becomes low.

It is preferable to satisfy following formula (2') instead of the formula (2).

$$|f3/f2|<0.7 \quad (2')$$

It is further preferable to satisfy following formula (2") instead of the formula (2).

$$|f3/f2|<0.6 \quad (2")$$

Further, the first to the third lens are to be structured so as to satisfy a following formula (3).

$$0.04<f/f2<3 \quad (3)$$

Where, f denotes a focal length of the total optical system.

The formula 3 provides an appropriate power of the second lens against the total imaging optical system. When the value of f/f2 is set outside of the lower limit and the power of the second lens becomes week, coma aberration becomes worse, Petzval sum is corrected too much, and resolution power becomes deficient. On the other hand, when the value of f/f2 is set outside of the upper limit of the formula (3) and the power of the second lens becomes strong, the Petzval sum is insufficiently corrected and the image surface curvature is not be able to be corrected.

It is preferable to satisfy following formula (3') instead of the formula (3).

$$0.115<f/f2<2 \quad (3')$$

It is further preferable to satisfy following formula (3") instead of the formula (3).

$$0.12<f/f2<1 \quad (3")$$

Further, the first to the third lens are to be structured so as to satisfy a following formula (4).

$$-18<(r21+r22)/(r21-r22)<200 \quad (4)$$

Where, r21 denotes a radius of curvature of the second lens in the object side and r22 denotes a radius of curvature of the second lens in the image side.

The formula (4) provides an appropriate range of the structure of the second lens and allows the imaging optical system to balance astigmatism while shorting the total length of the imaging optical system. When the value of (r21+r22)/(r21−r22) is set outside of the lower limit of the formula (4), the total length of the imaging optical system is able to be shortened. However, the astigmatism becomes large and the correction of the aberration becomes impossible. On the other hand, when the value of (r21+r22)/(r21−r22) is set outside of the upper limit of the formula (4), the astigmatism can be suppressed. However, the total length of the imaging optical system becomes long.

It is preferable to satisfy following formula (4') instead of the formula (4).

$$1<(r21+r22)/(r21-r22)<150 \quad (4')$$

It is further preferable to satisfy following formula (4") instead of the formula (4).

$$3<(r21+r22)/(r21-r22)<120 \quad (4")$$

An imaging optical system of the present invention is able to be applied to a digital video camera for photographing motion pictures, a camera for a television-telephone, a camera for a door-phone and a mobile computer and a camera, which is built into information apparatuses, such as a portable information terminal.

A preferred embodiment of the present invention is able to provide an imaging optical system including a first lens having a positive power, a second lens having positive power and a third lens having negative power and an aspherical surface in an image side. In the imaging optical system, aberrations such as chromatic aberration are appropriately corrected, the imaging optical system being shaped in a small size with a low cost by setting the Abbe numbers of the second and third lenses within an appropriate range.

EXAMPLES

The structures of imaging optical systems of embodiments of the present invention will be further concretely described by using construction data and aberration drawings. The first to fourth examples to be described here as examples of the present invention are respectively corresponding to the first to fourth embodiments of the present invention described above. Lens structure drawings (FIGS. 1-4) respectively correspond to the lens structures of the first to fourth embodiments of the present invention.

In the construction data illustrated in Tables 1-8, "r" denotes a radius of curvature by putting a surface number in the order of a position from the object side, "d" denotes an axial distance, and the axial distance from the object is shown in the order from the upper portion of the tables. "N" denotes a refraction index and "v" denotes an Abbe number. The refractive index and the Abbe number in the order of a position from the object will be shown in the order of a position from the top of the table. The refractive index and the Abbe number are to be defined for d-line. The refractive index and the Abbe number of air are omitted here. "*" mark following the surface number denotes that the corresponding lens is an aspherical lens. An image pickup device is to be placed behind the last surface. A focal length (f) and F-number (FNO) will be shown together with other data. The unit of the focal length and the radius of curvature are shown in "mm".

An aspherical surface is defined by a following formula (5).

$$X(H)=C \cdot H^2/\{1+(1-\epsilon \cdot C^2 \cdot H^2)^{1/2}\}+\Sigma Ak \cdot Hk \quad (5)$$

Where H denotes a height in the perpendicular direction against the optical axis, X(H) denotes a quantity of displacement (based on the top of the surface) in the optical axis direction at the height H, C denotes a paraxial curvature, $\epsilon$ denotes a quadric surface parameter, k denotes the order number of an aspherical surface, Ak denotes an aspherical surface coefficient of k-order, Hk denotes that H is multiplied by H itself k times. Character E added to the data shown in Tables 2, 4, 6 and 8, which show data related to an aspherical surface, denotes an exponent portion of the corresponding number. For example, 1.0 E−02 denotes $1.0 \times 10^{-2}$.

In aberration drawings shown in FIGS. 5(A)-8(C), line-d in FIGS. 5(A), 6(A), 7(A) and 8(A) denote the aberration for the d-line, g denotes the aberration for the g-line, c denotes the aberration under the c-line and a line SC denotes a quantity of dissatisfaction of the sine condition. A line DM and a line DS in the astigmatism respectively denote aberrations on a meridional surface and a sagittal surface. The unit of the horizontal axis of distortion is percentage (%) and the unit of other axes is mm.

The values of each example corresponding to the conditional formula are shown in Table 9. Each example satisfies the conditional formulas.

TABLE 1

| | <Example 1> F = 4.48 FNo. = 4.0 | | | |
|---|---|---|---|---|
| Drawing No. | Radius of Curvature (r) | Axial distance (d) | Refraction Index (N) | Abbe number (v) |
| 1* | 1.922 | 0.871 | 1.62971 | 50.30 |
| 2* | 6.040 | 0.215 | | |
| 3 | 0.000 | 0.881 | | |
| 4* | −3.736 | 0.794 | 1.58340 | 30.23 |
| 5* | −2.547 | 0.346 | | |

TABLE 1-continued

<Example 1>
F = 4.48 FNo. = 4.0

| Drawing No. | Radius of Curvature (r) | Axial distance (d) | Refraction Index (N) | Abbe number (v) |
|---|---|---|---|---|
| 6* | 4.210 | 0.600 | 1.53048 | 55.72 |
| 7* | 1.563 | 0.483 | | |
| 8 | 0.000 | 0.500 | 1.51680 | 64.20 |
| 9 | 0.000 | 0.000 | | |

TABLE 2

[Aspherical surface data]

r1

$\epsilon = 0.35947029$
$A4 = -0.25176297E-02$
$A6 = 0.14873782E-01$
$A8 = -0.13524321E-01$
$A10 = 0.47745052E-02$ r2

$\epsilon = 2.49822030$
$A4 = -0.13183750E-01$
$A6 = 0.81737234E-02$
$A8 = -0.14045167E-01$
$A10 = 0.19222229E-01$ r4

$\epsilon = 1.02284200$
$A4 = 0.45326867E-02$
$A6 = -0.21564584E+00$
$A8 = 0.17884819E+00$
$A10 = -0.12781283E+00$ r5

$\epsilon = 1.23346130$
$A4 = -0.12983852E-01$
$A6 = -0.14617190E-01$
$A8 = -0.93859672E-02$
$A10 = 0.67788275E-02$ r6

$\epsilon = -4.00000000$
$A4 = -0.23227104E+00$
$A6 = 0.57072422E-01$
$A8 = 0.15872553E-03$
$A10 = -0.92766170E-03$ r7

$\epsilon = -6.00000000$
$A4 = -0.10446996E+00$
$A6 = 0.20883036E-01$
$A8 = -0.25247656E-02$
$A10 = 0.95140585E-04$

TABLE 3

<Example 2>
F = 4.73 FNo. = 4.0

| Drawing No. | Radius of Curvature (r) | Axial distance (d) | Refraction Index (N) | Abbe number (v) |
|---|---|---|---|---|
| 1* | 1.909 | 0.873 | 1.62971 | 50.30 |
| 2* | 6.174 | 0.213 | | |
| 3 | 0.000 | 0.790 | | |
| 4* | -3.249 | 0.928 | 1.58340 | 30.23 |
| 5* | -2.401 | 0.397 | | |
| 6* | 4.742 | 0.600 | 1.53048 | 55.72 |
| 7* | 1.729 | 0.488 | | |

TABLE 3-continued

<Example 2>
F = 4.73 FNo. = 4.0

| Drawing No. | Radius of Curvature (r) | Axial distance (d) | Refraction Index (N) | Abbe number (v) |
|---|---|---|---|---|
| 8 | 0.000 | 0.500 | 1.51680 | 64.20 |
| 9 | 0.000 | 0.000 | | |

TABLE 4

[Aspherical surface data]

r1

$\epsilon = 0.37176673$
$A4 = -0.10708997E-02$
$A6 = 0.57750393E-02$
$A8 = -0.18374313E-02$
$A10 = -0.96342731E-03$ r2

$\epsilon = -5.80092320$
$A4 = -0.16591508E-01$
$A6 = 0.61715443E-02$
$A8 = 0.30902480E-01$
$A10 = -0.63437142E-01$ r4

$\epsilon = 1.83332890$
$A4 = -0.16302471E-01$
$A6 = -0.15623809E+00$
$A8 = 0.65532571E-01$
$A10 = -0.93380306E-01$ r5

$\epsilon = 0.35335148$
$A4 = 0.80404406E-02$
$A6 = -0.15373236E-01$
$A8 = -0.10722019E-01$
$A10 = 0.46316308E-02$ r6

$\epsilon = -4.00000000$
$A4 = -0.14634721E+00$
$A6 = 0.36555032E-01$
$A8 = -0.35222318E-02$
$A10 = 0.11704612E-03$ r7

$\epsilon = -5.55037760$
$A4 = -0.79675605E-01$
$A6 = 0.13503385E-01$
$A8 = -0.13275655E-02$
$A10 = 0.34697536E-04$

TABLE 5

<Example 3>
F = 4.73 FNo. = 4.0

| Drawing No. | Radius of Curvature (r) | Axial distance (d) | Refraction Index (N) | Abbe number (v) |
|---|---|---|---|---|
| 1* | 1.925 | 0.863 | 1.66910 | 55.40 |
| 2* | 5.863 | 0.215 | | |
| 3 | 0.000 | 0.867 | | |
| 4* | -1.757 | 0.902 | 1.58340 | 30.23 |
| 5* | -1.990 | 0.240 | | |
| 6* | 3.093 | 0.758 | 1.51742 | 52.15 |
| 7* | 1.856 | 0.750 | | |
| 8 | 0.000 | 0.500 | 1.51680 | 64.20 |
| 9 | 0.000 | 0.000 | | |

TABLE 6

[Aspherical surface data]

r1

ε = 0.40188716
A4 = −0.63877031E−03
A6 = 0.60714497E−02
A8 = −0.43697258E−02
A10 = −0.12439563E−02 r2

ε = 2.36431140
A4 = −0.24102660E−01
A6 = −0.44416453E−02
A8 = 0.16103239E−01
A10 = −0.38091394E−01 r4

ε = 1.29935110
A4 = 0.20284143E−02
A6 = −0.18728982E+00
A8 = 0.53630465E−01
A10 = −0.70586498E−01 r5

ε = 0.64220174
A4 = −0.75436027E−02
A6 = −0.13983007E−01
A8 = −0.56716493E−02
A10 = 0.65784250E−02 r6

ε = −1.20015200
A4 = −0.14629082E+00
A6 = 0.36773375E−01
A8 = −0.35191642E−02
A10 = 0.10151373E−03 r7

ε = −5.74046630
A4 = −0.76611749E−01
A6 = 0.13750076E−01
A8 = −0.19617360E−02
A10 = 0.10401028E−03

TABLE 7

<Example 4>
F = 4.51 FNo. = 4.0

| Drawing No. | Radius of Curvature (r) | Axial distance (d) | Refraction Index (N) | Abbe number (ν) |
|---|---|---|---|---|
| 1* | 1.879 | 0.897 | 1.66910 | 55.40 |
| 2* | 5.181 | 0.224 | | |
| 3 | 0.000 | 0.793 | | |
| 4* | −3.445 | 1.347 | 1.58340 | 30.23 |
| 5* | −3.371 | 0.100 | | |
| 6* | 2.137 | 0.600 | 1.53048 | 55.72 |
| 7* | 1.323 | 0.500 | | |
| 8 | 0.000 | 0.500 | 1.51680 | 64.20 |
| 9 | 0.000 | 0.000 | | |

TABLE 8

[Aspherical surface data]

r1

ε = 0.50464679
A4 = 0.15735059E−02
A6 = 0.10387112E−01
A8 = −0.56732220E−02
A10 = 0.44033552E−03

TABLE 8-continued

[Aspherical surface data]

r2

ε = 5.55893160
A4 = −0.11100094E−01
A6 = 0.11264783E−01
A8 = −0.31637528E−01
A10 = 0.83917015E−02 r4

ε = 0.30986461
A4 = 0.27347717E−02
A6 = −0.17159526E+00
A8 = 0.95641349E−01
A10 = −0.90838576E−01 r5

ε = 1.21408060
A4 = −0.90149917E−02
A6 = 0.15387141E−02
A8 = −0.61171216E−02
A10 = 0.16391751E−02 r6

ε = −3.90057710
A4 = −0.13978512E+00
A6 = 0.36893316E−01
A8 = −0.36140114E−02
A10 = 0.11878957E−03 r7

ε = −3.28244620
A4 = −0.79345867E−01
A6 = 0.13482111E−01
A8 = −0.12844399E−02
A10 = 0.63484118E−04

TABLE 9

[Value corresponding to conditional formula]

| | ν3 − ν2 | |f3/f2| | (r21 + r22)/(r21 − r22) | f/f2 |
|---|---|---|---|---|
| Example 1 | 25.49 | 0.46 | 5.28 | 0.41 |
| Example 2 | 25.49 | 0.49 | 6.66 | 0.4 |
| Example 3 | 21.92 | 0.19 | −16.08 | 0.08 |
| Example 4 | 25.49 | 0.25 | 92.11 | 0.13 |

What is claimed is:

1. An imaging optical system for focusing light from an object on an image pickup device, comprising in the following order from an object side:

a first lens with positive power having a meniscus shape convex to the object side;

a second lens with positive power having a meniscus shape convex to the image side; and a third lens with negative power having a meniscus shape concave to the image side, an image side surface of the third lens being aspherical, wherein the aspherical surface is concave to the image side in a vicinity of an optical axis and convex to the image side in a surrounding of the optical axis, and an Abbe number ν2 of the second lens and an Abbe number ν3 of the third lens satisfy the following relationship:

ν3−ν2>10.

2. The imaging optical system of claim 1, comprising:
a diaphragm between the first and the second lens.

3. The imaging optical system of claim 1, wherein the first through third lenses are made of homogeneous medium.

4. The imaging optical system of claim 1, wherein a focal length f2 of the second lens and a focal length f3 of the third lens satisfy the following relationship:

$|f3/f2|<0.9.$

5. The imaging optical system of claim 1, wherein an overall focal length f of the imaging optical system and a focal length f2 of the second lens satisfy the following relationship:

$0.04<f/f2<3.$

6. The imaging optical system of claim 1, wherein a curvature radius r21 of an object side surface of the second lens and a curvature radius r22 of an image side surface of the second lens satisfy the following relationship:

$-18<(r21+r22)/(r21-r22)<200.$

* * * * *

UNITED STATES PATENT AND TRADEMARK OFFICE
CERTIFICATE OF CORRECTION

PATENT NO.       : 7,646,553 B2
APPLICATION NO.  : 11/593818
DATED            : January 12, 2010
INVENTOR(S)      : Masashi Isono It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this

Sixteenth Day of November, 2010

David J. Kappos
*Director of the United States Patent and Trademark Office*